June 27, 1967  L. B. MUSTAIN  3,327,940
AUTOMATIC CARD NOTCHER

Filed April 23, 1965  8 Sheets-Sheet 4

INVENTOR
Lewis B. Mustain
BY
Wood, Herron & Evans
ATTORNEYS

Fig. 5

INVENTOR
Lewis B. Mustain
BY
Wood, Herron & Evans
ATTORNEYS

June 27, 1967  L. B. MUSTAIN  3,327,940
AUTOMATIC CARD NOTCHER
Filed April 23, 1965  8 Sheets-Sheet 7

INVENTOR
Lewis B. Mustain
BY
Wood, Herron & Evans
ATTORNEYS

June 27, 1967        L. B. MUSTAIN        3,327,940

AUTOMATIC CARD NOTCHER

Filed April 23, 1965        8 Sheets-Sheet 8

INVENTOR
Lewis B. Mustain
BY
Wood, Herron & Evans
ATTORNEYS 3,327,940
AUTOMATIC CARD NOTCHER
Lewis B. Mustain, Cincinnati, Ohio, assignor to The
Mosler Safe Company, Hamilton, Ohio, a corporation
of New York
Filed Apr. 23, 1965, Ser. No. 450,285
20 Claims. (Cl. 234—46)

ABSTRACT OF THE DISCLOSURE

An apparatus for edge notching cards according to a predetermined code. The individual notching punches are movably mounted for movement from a reference position to any one of a plurality of punch sites according to the location of a punch field selector mechanism so that when a card is subsequently inserted into the machine, it is automatically punched at the selected sites.

---

This invention relates to a card notcher, and more particularly to an apparatus for automatically notching a file card or the like upon insertion of the card after manual punch field selection. While the apparatus is shown and described in an application involving notching file card edges, the apparatus may be modified for selectively punching the card interiorly of the edges.

File cards of conventional size may be selectively notched along the file card edges at selected areas representing units, tens, hundreds, etc., to facilitate automatic card sorting, filing and locating. In the past, file cards have been selectively notched or punched by manual notchers in implement form. Obviously, this method of notching the file card edges is extremely slow and highly subject to error.

More advanced notchers and punching apparatus generally take the form of a device including a row of aligned, stationary punch assemblies, one for each notch or punch field position. Manual means are used for selectively setting up one or more of the punches and normally a common, manually operated punch actuator simultaneously operates the selected punch assemblies to notch the edge of the file card. Such devices are complicated and expensive due to the requirement of having the same number of punches as punch positions. In addition, the devices are completely manual in operation and while accuracy is improved, the output rate is not appreciably increased.

It is, therefore, a primary object of this invention to provide an improved card notcher for notching file card edges and the like which is completely automatic in operation.

It is a further object of this invention to provide an improved card notcher of this type which eliminates the need for providing individual punch assemblies for each punch field position.

It is a further object of this invention to provide an improved fully automatic card notcher which employs manual punch field selection means and in which the card is automatically punched at the selected field position as a result of insertion of the card into the card notcher and is automatically ejected from punch position after punching.

It is a further object of this invention to provide a fully automatic card notcher in which the punch field selection means is automatically indexed to the next higher numeric position unless otherwise manually indexed.

It is a further object of this invention to provide an improved, fully automatic card notcher of this type in which recycling of the notcher is prevented if the punched card remains in punch position.

It is a further object of this invention to provide an improved, fully automatic card notcher of this type in which visual vertification of punch field selection may be readily had.

The foregoing and other objects, features and advantages of the invention will be apparent from the following more particular description of a preferred embodiment of the invention, as illustrated in the accompanying drawings.

In the drawings:

FIGURE 1 is a top plan view of the portion between the side walls of the apparatus shown in FIGURE 1.

In general, the automatic card punch of the present invention includes means for supporting a card in operative position with respect to an associated punch assembly. The punch assembly is positioned for relative movement with respect to the card edge to allow selective notching of the card edge at one of several field positions. Means are provided for normally biasing the punch assembly at a reference position. Manual field selection means select the punch field position with respect to the card edge, and means are provided which are automatically responsive to placement of the card in card punch position for moving the punch assembly from the reference position to a position corresponding to punch field selection and for subsequently punching the card. Means are further provided for returning the punch assembly to the reference position at the end of each cycle and for ejecting the punched card from its card punch position. Means are further provided for sequentially, automatically indexing the punch field selection means to the next higher numeric position unless manually indexed to a different field selection position. The apparatus includes interlock means for preventing recycling until the punched card is withdrawn. It also includes a card supporting surface provided with check indicia for visually verifying punch location against manual field selection.

Figure 1:
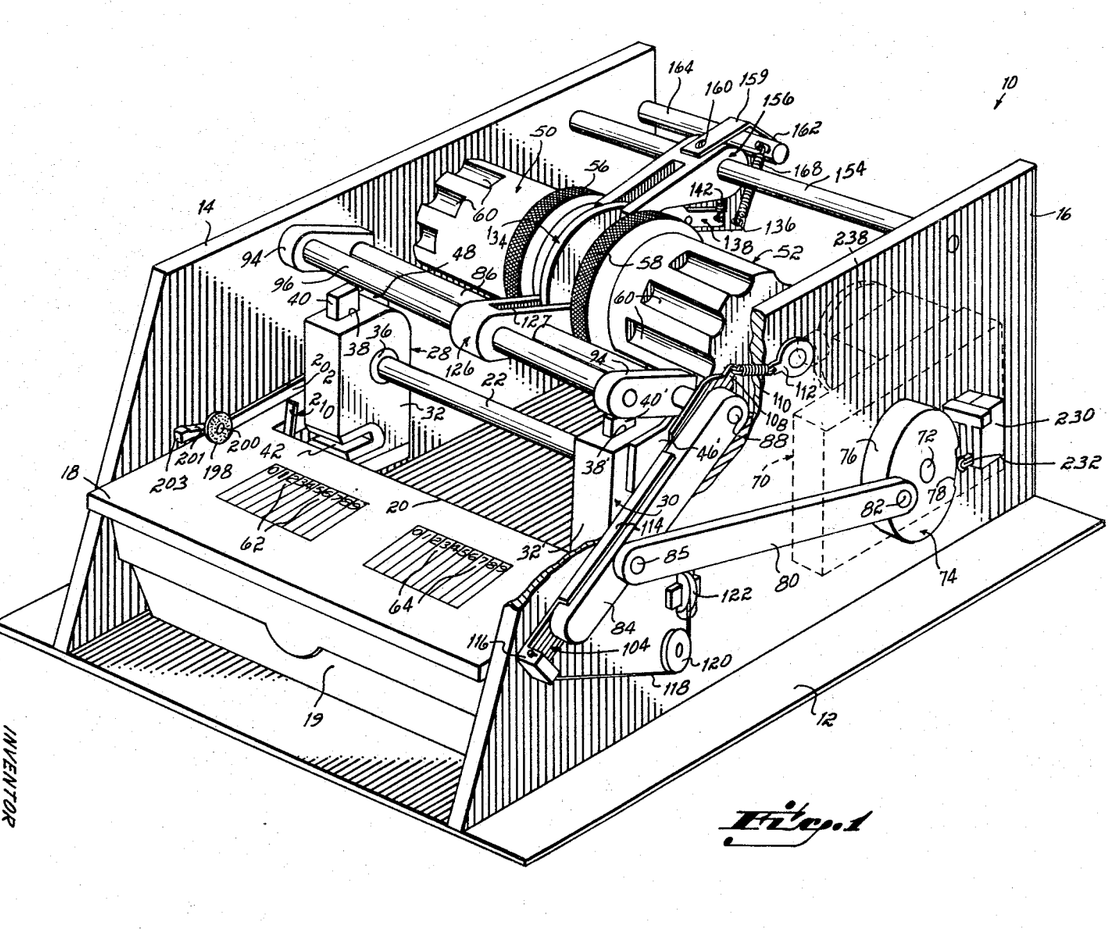
FIGURE 1 is a perspective view of the improved card notcher of the present invention in a preferred form with the top cover removed.

Referring to the drawings, there is shown in FIGURE 1 a simplified, fully automatic card notcher of the present invention in a preferred form. The card notcher, indicated generally at 10, includes a thin sheet metal base 12 and spaced left and right hand side walls 14 and 16 respectively. They may be welded or otherwise attached rigidly to the base 12 in upright position. Sandwiched between the side walls 14 and 16 is a table 18 at the forward or open end of the machine. The table 18 is rigidly coupled to the side walls by means not shown, and is spaced above the base 12 to slidably receive a scrap drawer 19. The table 18 extends only partially within the side walls, with its inner end 20 terminating slightly in front of a transversely extending punch support rod 22. The outer ends 24 of the rod 22 pass through suitable openings 26 within respective side walls 14 and 16. The support rod 22 may be coupled and held within the side walls by force fitting or other means to prevent rotation of the rod about its axis.

Figure 5:
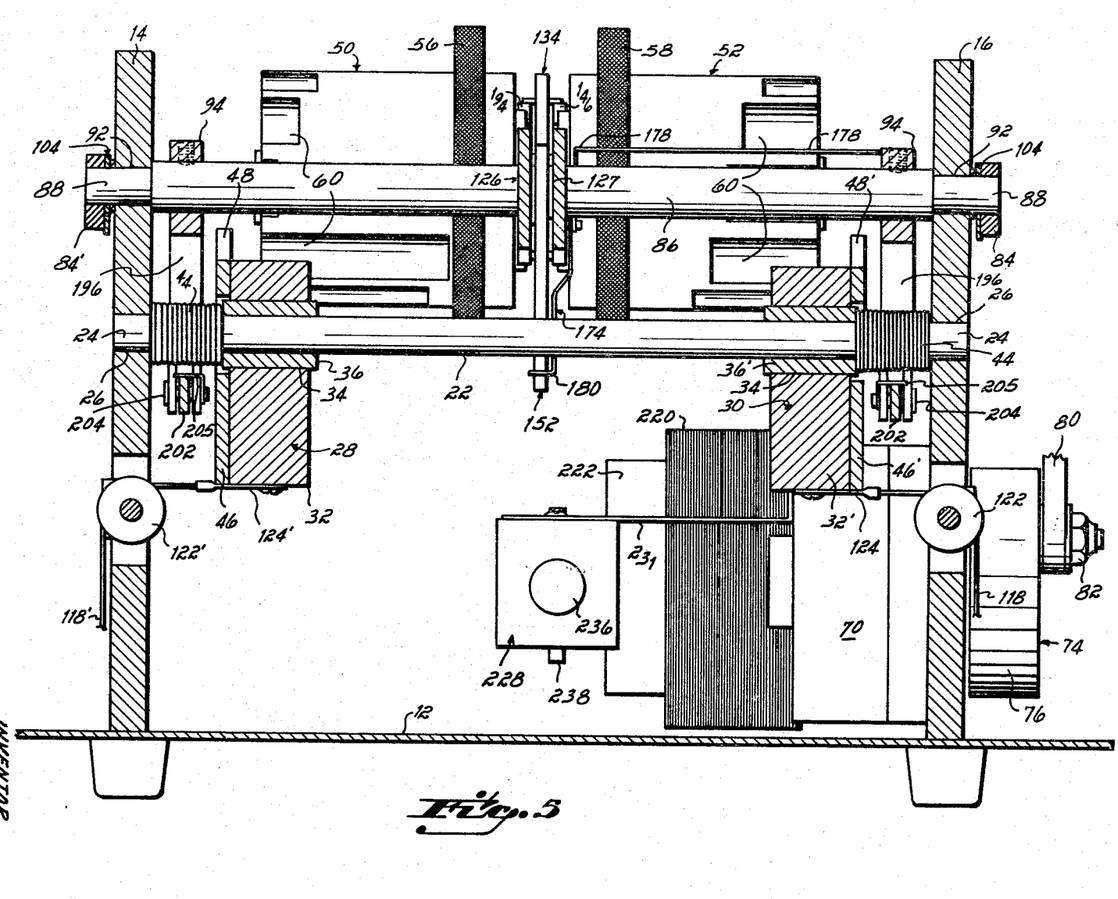
FIGURE 5 is a cross sectional view taken along lines 5—5 of FIGURE 3.

A pair of identical left and right hand punch assemblies, which may be designated arbitrarily as tens punch assembly 28 and units punch assembly 30, respectively, are supported by rod 22 for slidable movement along the support rod. Only the tens punch will be described and like components of the units punch will be referred to by prime members. The punch assembly 28 includes a punch block 32 having an opening 34 formed therein, for receiving a bushing 36. The bushing 36 receives rod 22, thus allowing the punch assembly to slide along the axis of the support rod. Punch assembly 28 further includes a vertical slot or opening 38, FIGURE 1, within which is mounted a vertically, reciprocating punch member 40. The punching member 40 is biased in an upward position by a compression spring 41, and normally occupies the reference position shown in FIGURE 1. The punch assembly 28 includes a U-shaped recess 42 which extends across the forward end of the punch assembly, adjacent the upper surface of table 18 to receive the inner edge of the file card for selective notching in one of many punch field positions or areas. Other than the fact that each of the punch assemblies 28 and 30 is supported for slidable transverse movement on rod 22, the punch assemblies are conventional in nature. The punch members 40 and 40′ may be rectangular in cross-section and the bottom punch surface of the punch may preferably be hollow ground and inclined so as to minimize card resistance to punch operation and extend the contact time between the punch and the file card over a fair portion of the punch cycle. The notching members or punches 40 and 40′ are of different lengths so that one is forced through the card before the other to minimize the pressure required to notch the card. Reference to FIGURE 5 indicates that both punch assemblies 28 and 30 are spring-biased towards the center of the notcher by means of a pair of compression springs 44 which are sandwiched between the inner surface of the side walls and the bushing members 36 and 36′ respectively. Each punch assembly further includes an indexing head plate 46 having an indexing ear or head contact portion 48 extending upwardly and rearwardly therefrom. These ears 48 act as stops to limit axial movement of the punch assemblies 28 and 30 toward the center of the assembly along the axis of support rod 22 to an extent determined by the indexing of associated index heads.

Figure 2:
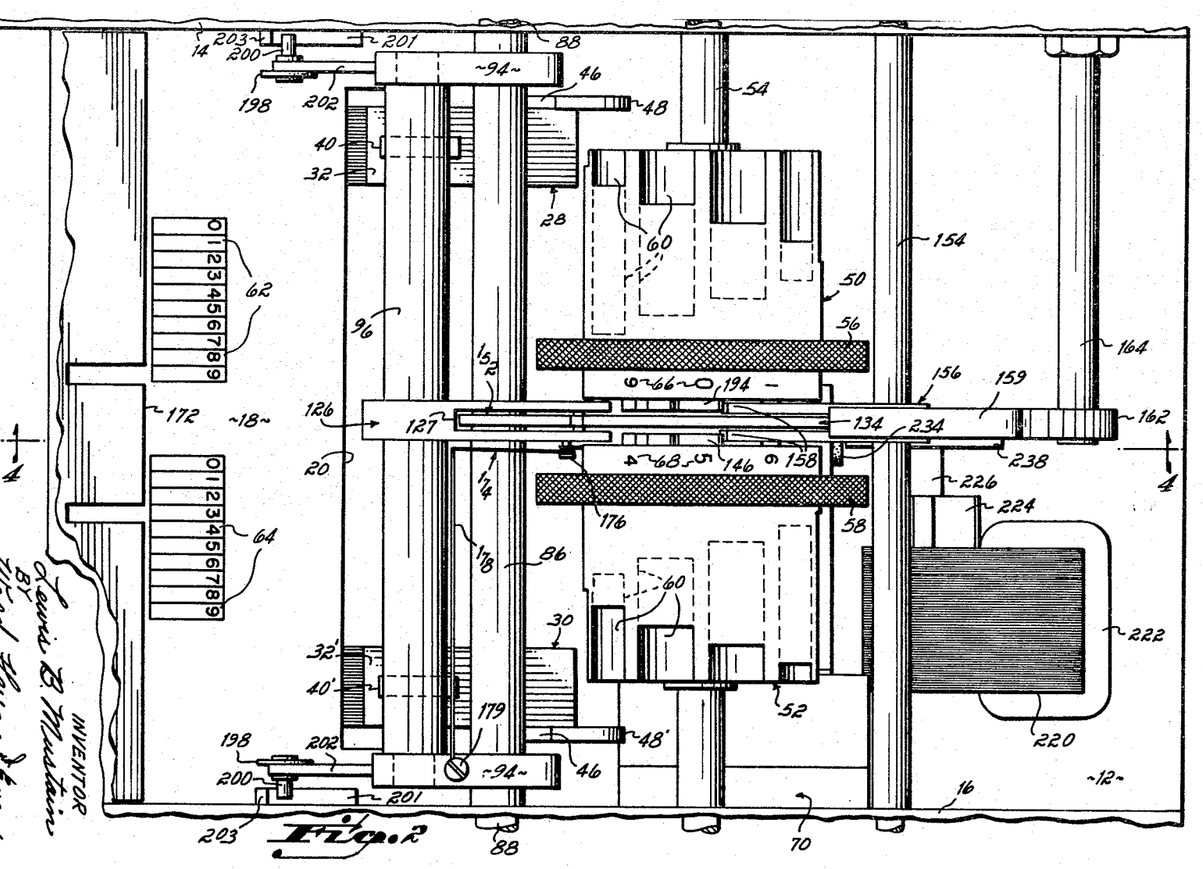

In the case of the apparatus shown, tens index head 50 cooperates with the ear 48 while units index head 52 cooperates with the ear 48′ of the units punch assembly 30. Referring to FIGURE 2, the tens index head 50 and the units index head 52 are cylindrical in shape, and are mounted for rotation on a shaft 54 which is supported by the spaced side walls 14 and 16. Each of the index heads 50 and 52 is mounted for free rotation about the shaft 54, independent of each other. An enlarged diameter serrated rim 56 allows manual rotation of the head 50 about its axis while the units index head 52 has a similar enlarged diameter rim 58 with a serrated surface, allowing independent rotation of head 52 about the common axis. Each of the indexing heads is provided with ten surface indentations or recesses 60 of varying axial length which are equally spaced, and circumferentially oriented about the periphery of the indexing head. The recesses 60 extend inwardly from the outer end of each head towards the serrated manual indexing surface formed by the raised rim.

With the spring-biased punch assemblies in the position shown in FIGURE 2, the individual indexing heads 50 and 52 may be either manually rotated to a selected index position, or automatically rotated by automatic sequential indexing means. The numerals 0 through 9 indicate the respective index position associated with the recesses 60 which correlate to file card punch field positions which may be visually checked by means of the indicia formed at sections 62 and 64 on the upper surface of table 18. The units punch field is indicated on the right hand side at 64 while the tens punch field is indicated by the left hand box 62. The positions of the varying numbers, 0 through 9, for instance, for visual reference or read-out area 62, is correlated to the numerals 0 through 9 which appear at 66 on the periphery of the indexing head 50 adjacent to the right of the serrated rim 56. This allows manual indexing of the head. Likewise, the numerals 0 through 9 forming the visual readout means for area 64 are likewise correlated to the numerals 68 appearing immediately to the left of the serrated rim 58 for indexing head 52. The indicia appearing within the slot on the cover (not shown) adjacent the manually rotated rim 56 is not correlated to the recesses 60 appearing in line with the indicia 66, but rather they are correlated to the particular recess 60 which is operatively positioned in line with follower plate extensions 48 and 48′.

As mentioned previously, each of the punch assemblies 28 and 30 is spring-biased toward the center of the apparatus; that is, to a position aligned with the respective visual indicators 62 and 64. They are however restrained by means associated with the automatic punch operator.

As best seen in FIGURE 1, a drive motor assembly, indicated generally at 70, acts to periodically rotate an output shaft 72, to which is coupled an annular cam wheel 74. The cam wheel carries a peripheral cam surface 76, including a recessed portion 78 extending over a limited angular distance. A connecting rod 80 is pivotally coupled at its rear to cam wheel 74 by means of an eccentrically position pin 82. The forward end of the connecting rod 80 is connected to a punch actuating lever arm 84 by pivot pin 85. The other end of the actuating lever arm 84 is supported by a transversely extending support rod 86 whose ends 88 pass through openings 92 in the end walls, as best seen in FIGURE 5.

The shaft or support rod 86 has fixed thereto a pair of radial support arms 94 carrying at their outer ends a transversely extending punch actuator rod 96. The rod is positioned so as to be in line with the plane of the punches 40 and 40′ such that as shaft 96 rotates counterclockwise, as view in FIGURES 3 and 4, the actuator will move into punch engaging position forcing the punches 40 downwardly. Punch 40 has a central reduced section 102 positioned within a recess 100, about which the spring 41 is coiled. As stated above, the spring acts upon the punch to normally bias it upwardly or to the position shown in FIGURE 4. Thus, regardless of the extent of transverse movement of the punch assemblies 28 and 30 from their reference positions shown in FIGURE 2, to extreme inward positions determined by the maximum recess 60 of the respective index heads 50 and 52, the punch actuator bar 96 at all times overlies the exposed upper ends of the punches 40 and 40′ so that the punches will be always actuated as a result of counterclockwise rotation of the actuator bar 96 about the axis of its support shaft 86.

In addition to supporting the punch actuator bar 96, through arms 94, the shaft 86 also supports a pair of spring-biased punch return arms 104, adjacent side walls 14 and 16. Arm 104 is mounted for rotation about the axis of the shaft 86 and positioned between the punch actuating lever arm 84 and the exterior surface of the respective side walls 14 and 16. The right hand punch return arm 104 includes at its pivotal connection end an enlarged section 106 which is suitably apertured for positioning upon shaft 86. Section 106 includes a radial tab 108 to which is attached one end of coil spring 110. The other end of the spring 110 is fixedly attached to side wall 16, by fastener 112.

Figure 7:
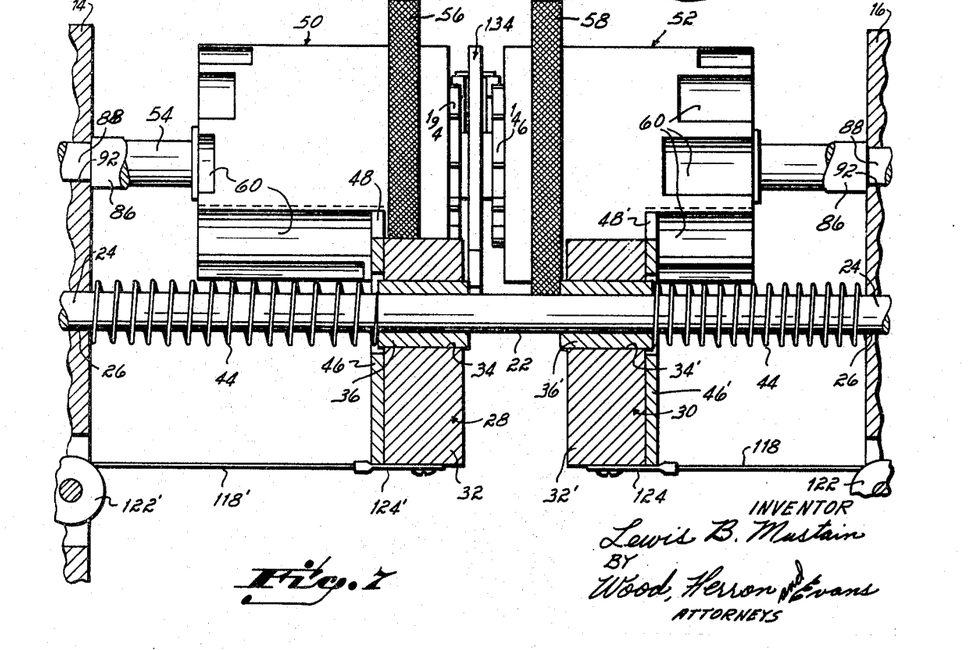
FIGURE 7 is a cross sectional view similar to FIGURE 5, but showing the punches engaged in the locator notches of the indexing heads.

The punch return arm 104 includes a ledge 114 running generally the length of the arm, at the top thereof, which prevents free counterclockwise rotation of the punch return arm 104, but does allow the punch return arm 104 to follow the counterclockwise rotation of the punch actuating lever arm 84 as it is positively driven by connecting rod 80. The extreme free end 116 of the punch return arm 104 includes means for suitably holding one end of cord 118, the cord being supported by suitable pulleys at 120 and 122. The inner end of the cord 118 is connected to the bottom of the punch assembly 30 by means of a terminal or connector 124. It is readily apparent, therefore, that the compression springs 44 act to bias the punch assemblies toward the center of the apparatus on the common shaft 22; but that such movement is restrained by the cord 118 carried by the punch return arm 104, and cord 118' carried by a second punch return arm, (not shown) identical in form, positioned along the outer surface of side wall 14. It is further obvious from the above description that as the punch actuating lever arm 84 rotates counterclockwise, it will tend to fall away from the punch return arm 104, so that the compressed coil springs 44 will cause the punch assembly 30 to move inwardly away from the reference position, to the position shown in FIGURE 7. The punch return arm will follow the punch actuating lever arm 84 until the punch assembly 30 is stopped by the engagement of ear 48 with a groove 60 of the index head 52.

Figure 6:
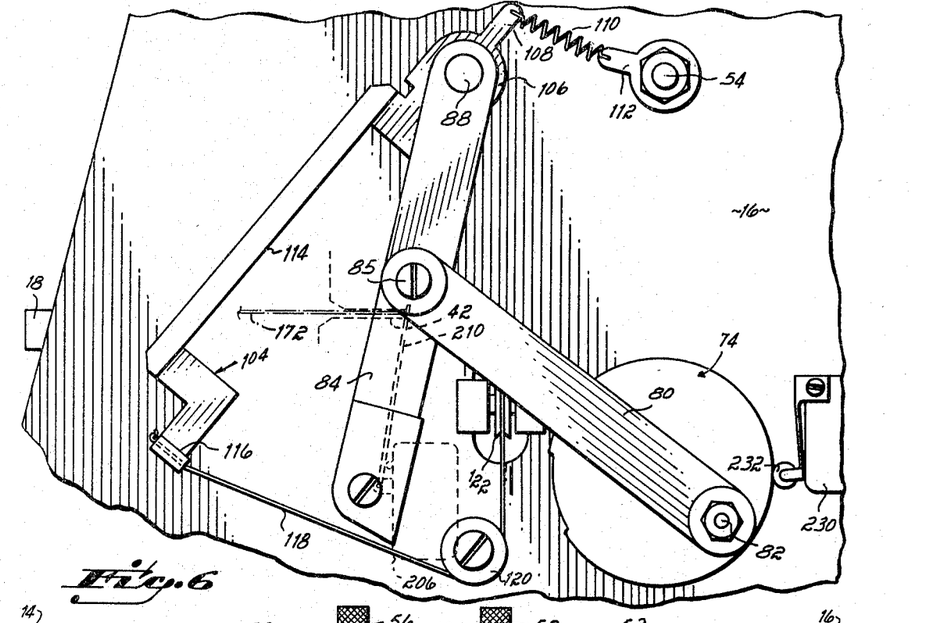
FIGURE 6 is a side elevation of a portion of FIGURE 3 showing the punch actuating lever in a position to punch a card inserted within the apparatus.

As best shown in FIGURE 6, when the inward movement of the punch assembly 30 is stopped and the rotation of punch return arm 104 is thus halted, the spring 110 maintains the arm 104 in place and the cord 118 taut. The arm 84 continues its oscillatory movement dictated by the rotating cam 74 and rod 80. As the arm 84 returns to its normal position, it will engage the ledge 114 to return the arm 104 and thus retract the ear 48 of the punch 30, from the groove 60 so that the head 52 can be indexed to another position. As stated above, another arm 114 (not shown) cooperates with an arm 84 (not shown) to allow punch 28 to move to a desired notching location and then to be retracted to its reference position.

Connecting rod 80, as a result of full rotation of cam wheel 76, causes oscillation of actuating lever arm 84 about the pivot axis formed by shaft 86 in conventional connecting rod drive fashion. The oscillation of the connecting rod 84 is sufficient to cause oscillation of arms 94 and the punch actuator rod 96 carried thereby to effectively produce a single cycle of punch operation for each full 360° rotation of the driving cam 74 for both punch assemblies 28 and 30. During oscillation of the actuator rod 96, a cocking lever 126 which is carried centrally of rod 96 rotates in unison with arms 94. The cocking lever 126 is further rigidly coupled to the pivot shaft 86, FIGURE 1. Cocking lever 126 includes a central recess 127, FIGURE 2, at its inner end across which is positioned a cocking pin 128. This pin bears against a shoulder 130 formed by cocking notch 132 within cocking disc 134. The notched cocking disc 134 is freely supported upon the shaft 54 which acts as a common support for the freely rotatable indexing heads 50 and 52. In this respect, the cocking disc 134 is positioned between the two indexing heads and spaced slightly from the inner surfaces thereof. By reference to FIGURE 4, it is seen that the single cocking disc 134 includes radial section 136. On the right side of section 136, FIGURE 4, is mounted a cocking pawl 138, the pawl being rotatably positioned by pivot pin 140 and is spring-biased into a ratchet wheel engaging position by biasing spring 142.

As shown, pawl tip 144 is engaged with the ratchet wheel 146. In this case, wheel 146 is fixed to the units index head 52. In addition to cocking lever notch 132, the cocking disc 134 includes a holding notch or recess 148 which receives the projecting end 150 of the hold pawl 152.

A transverse supporting shaft 154 passes through a back-up preventing pawl 156, thus allowing the tip 158 of the pawl to normally engage the next tooth forward of the tooth engaged by cocking pawl 138. This prevents clockwise rotation of indexing head 50 about the shaft axis 54 during counterclockwise rotation of the cocking disc 134 under the influence of the cocking lever 126. In order to accomplish this, an L shaped spring member 159 is rigidly coupled to the top of the holding pawl 156 by screw 160 with the free end 162 resting against protruding rigid shaft 164 which extends laterally away from side wall 14. Shaft 164 further carries a threaded, adjustable pin 166. The outer end of the pin 166 is apertured and receives one end of coil spring 168. The other end of the coil spring is coupled to the radial section 136 of the cocking disc 134 to restrain the disc against rotation in a clockwise direction.

Figure 4:
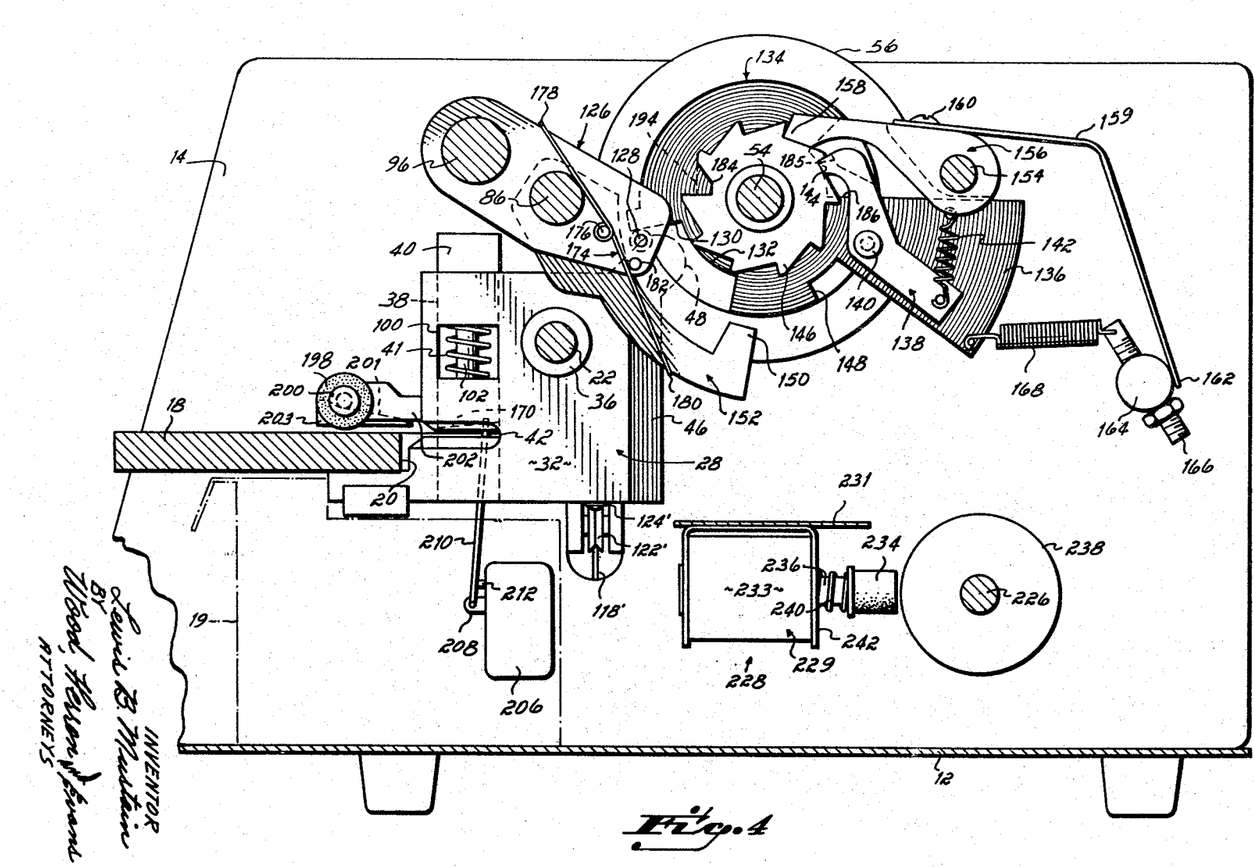
FIGURE 4 is a cross sectional view taken along the lines 4—4 of FIGURE 2.
Figure 8:
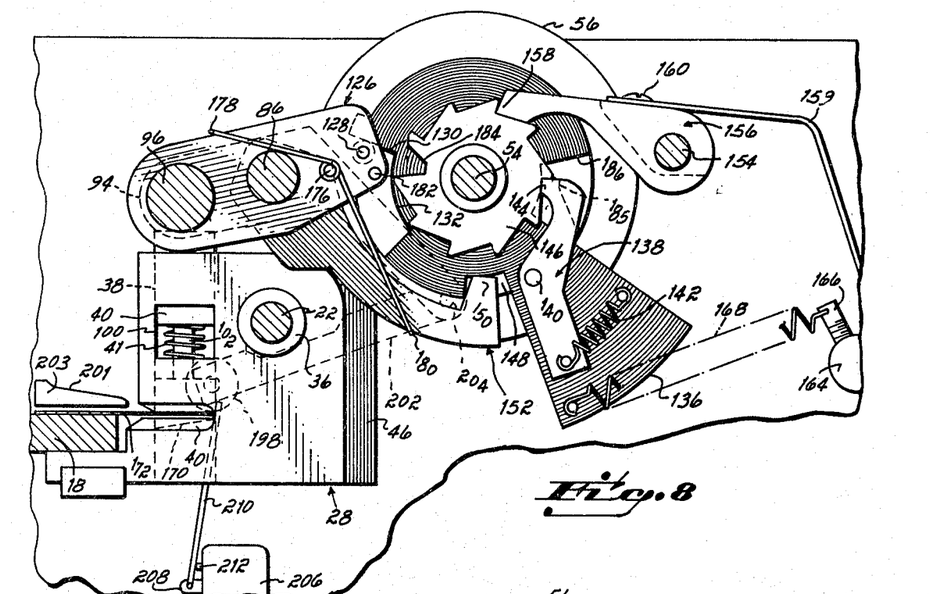
FIGURE 8 is a cross sectional view of a portion of the apparatus, similar to FIGURE 4, showing the relative positions of the indexing mechanism in the cocked position.

Referring to FIGURES 4 and 8, with the pawl tip 144 of cocking pawl 138 biased in a counterclockwise direction, rotation of the cocking disc 134 counterclockwise causes the tip 144 of the cocking pawl 138 to ride over the inclined surface of the teeth of the ratchet wheel section 146 so that during a single counterclockwise oscillation of the cocking lever 126 about the axis of shaft 86, the cocking pawl 138 will move a distance of one tooth with respect to the indexing head ratchet member 146. This movement only prepares the head for indexing to the next position. The head will not index until the hold pawl 150 has been pivoted from recess 148. The back-up prevention pawl 156 precludes clockwise rotation of the index head while the cocking pawl rides over the inclined surface and also prevents the heads from rotating freely when the notched cocking disc 134 is released.

At the start of the punch cycle, the cocking lever 126 is in the position shown in FIGURE 4 with cocking pin and roller 128 in contact with face 130 at the forward end of the cocking recess 132. As the cam wheel 74 rotates clockwise, pulling the eccentrically mounted crank shafts 80, the actuating lever arm 84 is oscillated counterclockwise rotating shaft 86. The cocking lever 126 mounted on shaft 86 is rotated in the same direction to effect a single downward movement of punches 40 and 40' by the actuator rod 96. This punching operation also forces the roller on pin 128 against the surface 130 to cause rotation of the cocking disc 134 from the position shown in FIGURE 4, against the bias of spring 168 to the position shown in FIGURE 8. In this figure, the punch actuator shaft 96 in shown in contact with the upper end of punch 40. Punch 40 moves downwardly against the bias of spring 41 and the edge 170 passes through the rear edge of the inserted card 172, at the punch field position dictated by the position of the indexing heads 50 and 52, thereby effecting notching of the file card. The cocking lever 126 is shown at its maximum counterclockwise, oscillatory position with cocking lever pin and roller 128 having moved the cocking disc 134 to its maximum clockwise rotational point against the tension of spring 168. During this movement, the cocking pawl 138, carried by the disc 134, has slipped clockwise over the edge of its previously engaged tooth into a position two notches spaced from that of the back-up prevention pawl 156. As the contact edge 144 of the pawl slides over this tooth, its biasing spring 142 ensures proper pawl and ratchet engagement while the pawl 156 prevents it from rotating the head in an undesired rotation. At the same time, the holding pawl 152, which is loosely positioned upon the same shaft 86, has its tip 150 spring-biased into the holding recess 148 of the disc 134 by a spring 174. Biasing spring 174 is wound around a pin 176 on the cocking lever 126 with one end 178 bent 90° so as to parallel the shaft 96 and be secured in position by a screw 179 on the arm 94, as best seen in FIGURE 2. The other end 180 is hooked over the outer surface of the holding pawl 152, thus tending to bias the pawl counterclockwise into the cocking disc 134.

Figure 9:
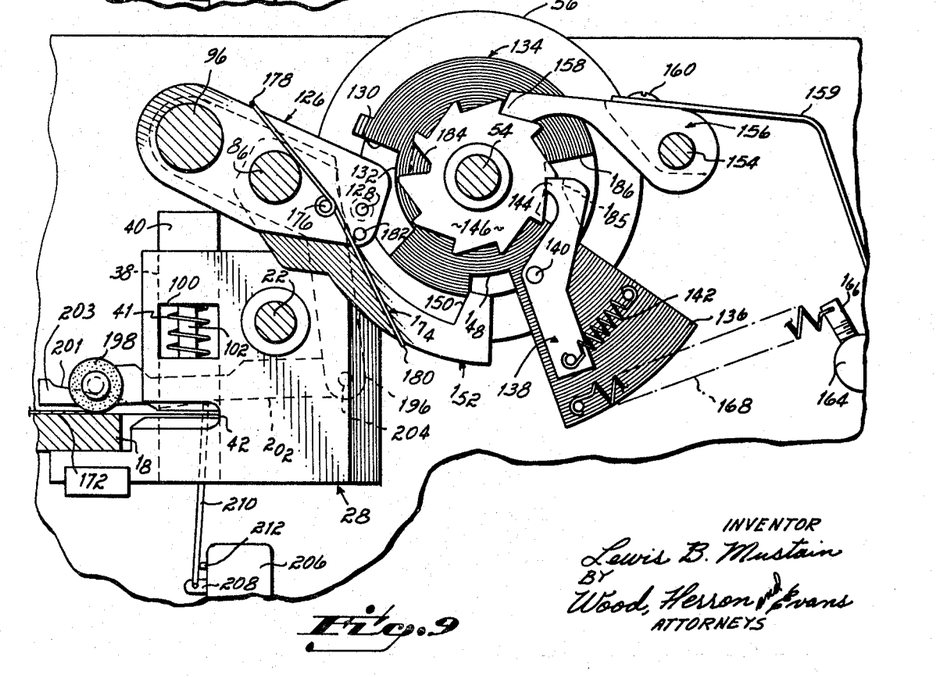
FIGURE 9 is a cross sectional view, similar to FIGURE 8, with the indexing mechanism about to be released.

Referring next to FIGURE 9, it is seen that upon notching of the card, the cocking lever 126 changes its direction of rotation about the axis of shaft 86 from counterclockwise to clockwise, thus moving pin and roller 128 away from surface 130. Even though biasing spring 168 is fully stretched, the cocking disc 134 does not rotate clockwise because of the presence of the holding pawl tip 150 within holding notch 148. However, when the cocking lever 126 rotates sufficiently so that a transversely extending kick-out pin 182 contacts the inner surface of pawl 152, it will drive hold pawl 152 out of the recess 148. As tip 150 clears the edge of the notch 148, the stretched spring 168 rotates the cocking disc 134 counterclockwise, an extent determined by contact of the radial section 136 with the shaft 154. The kick-out pin 182 also maintains the pawl 152 free of engagement with the cocking disc 134. In rotating counterclockwise the cocking pawl 138 causes the ratchet wheel 146 to rotate one tooth position in a counterclockwise direction, since the pawl 138 is maintained in engagement with its respective tooth. The back-up prevention pawl 156 will ride over the inclined surface of the tooth that it is contacting, as shown in FIGURE 9, and fall into the next succeeding tooth adjacent that which was occupied by the cocking pawl 138. The elements will then be in position for the start of the next cycle.

Figure 10:
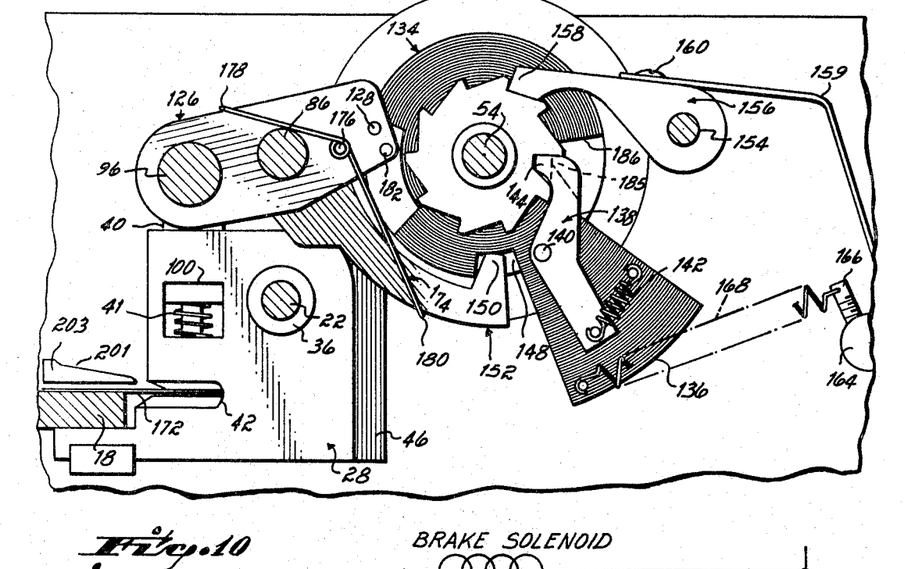
FIGURE 10 is an elevational view, similar to FIGURE 8, but with the cocking and rotating mechanism in position preparatory to indexing both the units and tens indexing heads.

The ratchet wheel 146 is shown having 10 teeth separated by inclined surfaces or notches of even depth, with the exception of one relatively deep notch 184. To this end, the cocking pawl 138 includes a second tip portion 185 that extends through a notch 186 in the disc 134 and is disposed above a tens indexing head ratchet wheel 194. This ratchet wheel 194 is similar to ratcher wheel 146 in that it has 10 teeth separated by 10 notches of even depth. As evidenced by the dotted line in FIGURES 8 and 9 the tip 185 of the pawl 138 is at a greater radial distance from the axis of shaft 54 than the tip 144 so that it is not normally in engagement with the ratchet wheel 194. As viewed in FIGURE 10, the tip 144 moves sufficiently counterclockwise into the deep notch 184, under the bias of spring 142 to effect the engagement of the tip 185 with the ratchet wheel 194. Thus, the tens index pawl is automatically indexed only one index position for each full ten index positions, or a complete cycle of rotation, of the index wheel 146 and its associated units index head 52 under the automatic indexing operation.

As best seen in FIGURES 8 and 9 the pair of radial support arms 94 are L-shaped in configuration and include a leg 196 which extends downwardly at some angle to the main section and is rigidly coupled to both actuator shaft 96 and support shaft 86. A friction wheel 198 is mounted for rotation by means of support shaft 200 on the outer end of a wheel support lever 202 which is pinned to the bottom end of leg 196 by connecting pin 204. The periphery of wheel 198 rests upon the upper surface of table 18 adjacent each side wall 14 and 16. Friction wheel 198 acts to automatically eject a punched card after notching as the lever moves forward during clockwise rotation of arms 94 about the shaft 86. After the punched card has been practically ejected by the friction wheel 198, an extension of the shaft 200 engages a cam surface 201 of a block 203 to raise the wheel 198 from contact with the card 172, and position the wheel so that another card can be inserted without interference. As shown only in FIGURE 5, a spring 205 biases the arm 202 downward and thus the wheel 198 assists in maintaining the card in position during a punching operation.

As mentioned previously, the complete operation is fully automatic with the exception of the manual indexing of the units and tens indexing heads. However, in case the heads are not manually indexed, they are automatically indexed 10 units position for every 1 tens position, as indicated previously. In order to provide a fully automated cycle of operations, the machine is equipped with a pair of microswitches positioned adjacent the inner surface of the side walls 14 and 16 respectively. For instance, in FIGURE 4, microswitch 206 is fixed to the wall and has a support member 208 projecting forwardly thereof. A thin microswitch actuator 210 is pivotally mounted to the support means 208 with its free end passing upwardly adjacent the rear edge 20 of the table 18, between the side wall 14 and the punch assembly 28. In this position, upon insertion of the file card into the recess 42, the microswitch actuator 210 will be pushed rearwardly against microswitch actuating pin 212 to close the normally open microswitch. A second identical microswitch is positioned adjacent the right hand side wall 16 between the inner surface of the side wall and the movable punch assembly 30. This microswitch is also a normally open microswitch and both microswitches operate in the circuit shown in FIGURE 11 to effect automatically a single cycle of operation upon insertion of the file card within the card receiving slots 42 and 42′ of the punch assemblies 28 and 30. The use of the spaced microswitches ensures proper positioning of the card so that both punch assemblies will accurately notch the card at the respective units and tens punch field position. This prevents misalignment of the card with respect to the punch assemblies.

Figure 3:
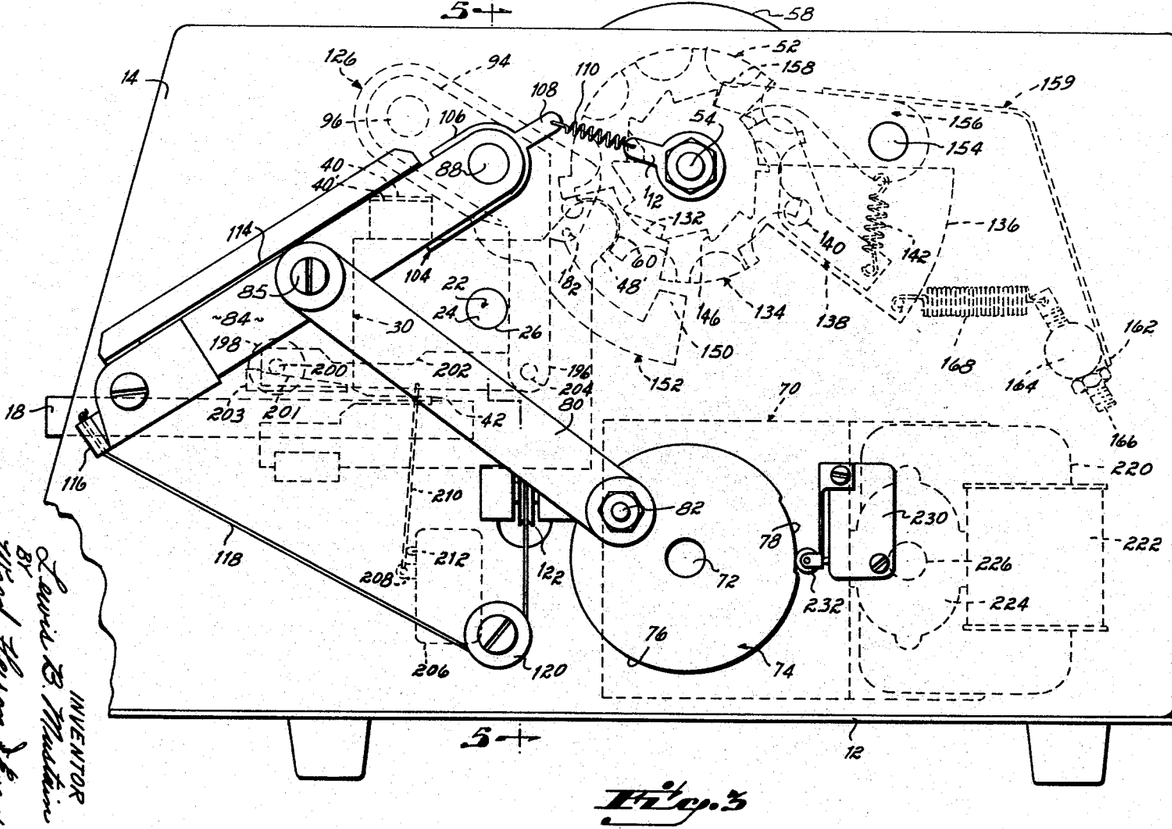
FIGURE 3 is a side elevation of the apparatus shown in FIGURE 1.

The apparatus includes electrical means to effect the automated operation; however, the apparatus would operate in the same manner were pneumatic or hydraulic means used. The dotted portion 70, of FIGURE 1, indicates, in general, the drive motor and its associated gear reduction means, etc., for cyclically rotating the cam wheel 74 the full 360° in a clockwise direction. The drive motor itself includes a core 220, FIGURE 2, and a motor winding 222 wrapped thereabout. In FIGURE 3, the armature is shown at 224 by the dotted line section with output shaft 226 coupled to the rectangular gear box 228, FIGURE 1. A cam operated switch housing 230 is fixed to the outer surface of side wall 16 and includes a cam follower member 232 which is spring-biased into contact position with the periphery 76 of the cam wheel 74. As shown in FIGURE 1, the cam is angularly positioned such that the follower 232 rides within the cam recess portion 78. In this position, the switch members carried by the housing 230 are in normally open position.

In addition to the motor, the card sensing switches and the cam switches which form a portion of the electrical circuit, the motor is associated with a brake solenoid 229 which is supported by the motor frame on member 231, FIGURE 4. The solenoid includes a coil 233 and a spring-biased friction brake member 234 carried on solenoid armature 236 and normally positioned in engagement with braking disc 238 coupled directly to the motor output shaft 226. The biasing spring 240 is captured between the inner end of the friction member 234 and the solenoid frame 242 and surrounds the armature 236. A holding relay 244 is indicated schematically in FIGURE 11 and includes normally open relay contact 246, the relay itself forming a portion of the rectangular box indicated at 70. Further, the motor employs a thermal cutout 248 which acts as an overload protection and which may consist of a bimetal normally closed switch as indicated schematically in FIGURE 11 at 248.

Figure 11:
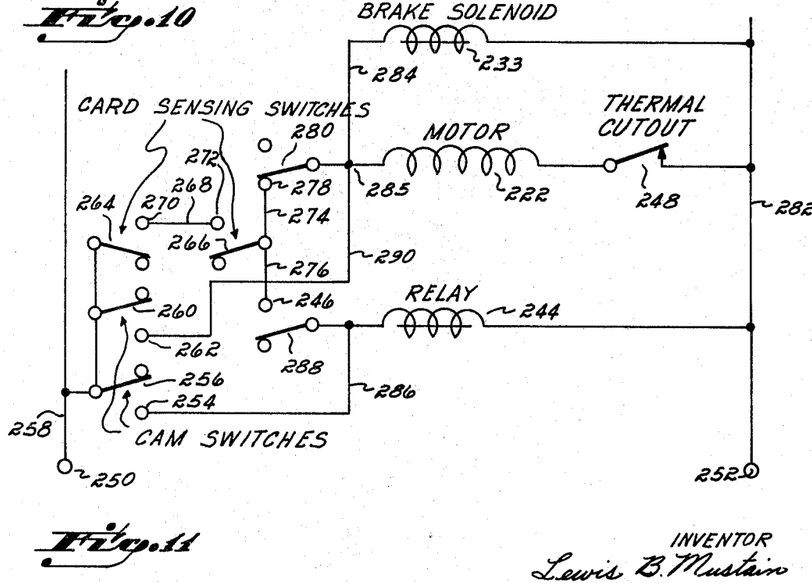
FIGURE 11 is a schematic drawing of the electrical circuit employed in the automatic card notcher of the present invention.

As shown in FIGURE 11, a source of suitable electrical voltage is supplied across terminals 250 and 252 for operating the electrical elements within the circuit. The cam operated switch assembly at 230 includes a normally open stationary contact 254 and a movable contact 256 which is coupled to input terminal 250 through line 258. A second movable, cam operated contact member 260 is also coupled to line 258 and is normally separated from the stationary contact 262. Line 258 is further connected to movable card sensing switch contact 264 which is normally in open switch position with respect to a lead 268. This lead 268 acts as a common connecting means between the stationary contacts 270 and 272 of the card sensing switches. A movable contact 266 of the second card sensing switch is also in normally open circuit position as indicated in the drawings. The second movable contact 266 is connected to a stationary contact 278 of relay 244 through a lead 274 and through a lead 276 it is connected to the second stationary contact 246 associated with the same relay. Normally closed movable contact 280 of the relay 244 connects the movable card sensing switch contact 266 directly to the motor winding 222, and the series connected thermal cutout 248. The other end of the thermal cutout is connected to the return line 282 which terminates at terminal 252. The brake solenoid winding 233 is connected by means of line 284 to the normally closed movable relay contact 280 by cross connection 285, while the other side of the brake solenoid is connected to the common return line 282. The relay 244 is connected by a line 286 to the normally open, stationary contact 254 of the cam operated switch 230 and to normally open, movable holding contact 288 of the relay 244. Again, the opposite side of the holding relay 244 is connected to return line 282. Both the motor winding 222 and the brake solenoid 233 are further connected to the stationary, normally open contact 262 of the cam switch 230 by means of line 290.

The automatic operation involving the elements shown in the electrical schematic drawing of FIGURE 11 will now be described. Upon insertion of the file card 172, the card, upon contacting the pivoted mircroswitch actuators 210, causes movement of the card sensing movable contact members 264 and 266 to a position where a circuit is completed from line 258 through contacts 264, 270, line 268, contacts 266 and 272 to the normally closed contacts 278 and 280 of the holding relay 244, thus energizing simultaneously the brake solenoid winding 233 and the motor winding 222. This drives the cam wheel 74 from the position shown in FIGURE 1 in a clockwise direction. As the cam wheel 74 rotates, the recess portion 78 rotates out of the path of the cam follower 232 and the cam follower 232 rides on the raised surface 76 of the cam. This causes the normally open cam switch contacts 256 and 260 to close upon stationary contacts 254 and 262 respectively. Meanwhile, the card sensing switches remain closed, maintaining energization of the brake solenoid and the motor.

Closure of movable cam operated contact 256 completes a circuit through line 258, contacts 254, 256, line 286 to the coil 244 of the holding relay. Energization of the relay coil 244 results in closing of normally open contact 246 setting up parallel completed circuits through the card sensing switches and the cam switches ensuring the continued energization of the holding relay 244. The cam wheel 74 continues to rotate in a clockwise direction until at the end of the punch operating cycle, after punching and return of the punches under the bias of their respective springs to the position shown in FIGURE 1, the full 360° rotation of the cam wheel results in moving the cam recess section 78 in to the position shown in FIGURE 1. At this time, the cam follower 232 falls within the recesses opening the movable cam switch contacts 256 and 260. Further, since, during the cycle of operation, the card is forceably ejected from its position within punch recesses 42 and 42′, the movable card sensing switch contacts 264 and 266 are now open. The motor and brake solenoid are de-energized and at approximately the same time cam follower 232 falls within cam recess 78. Since the holding relay is first energized by the cam switch and then de-energized by opening of the card sensing switches, the movable relay holding contact 280 which is normally closed upon the start of the cycle is opened upon energization of the holding relay 244, thus disconnecting the motor and brake solenoid from its source of voltage through the card sensing switches, but not affecting energization through the parallel circuit path including the normally open cam operated switch contact 260 and line 290. With holding relay contact 280 in the open switch position, rotation of the cam wheel 74 to a position where the cam follower 232 falls within recess 78 ensures de-energization of the motor and brake solenoid and stopping of the notcher at the end of each cycle, since at this point the movable contact 260 automatically moves to its open circuit position. With movable contact 260 of the cam operated switch open and movable contact 280 of the holding relay open regardless of closure of the card sensing switch contacts 264 and 266, only one cycle per card is possible.

From the above, it is apparent that the indexing heads 50 and 52 may be manually indexed to any one of 100 combinations at the end of each successive automatic punching cycle, while at the same time if manual indexing is not provided, automatic indexing one punch field position is achieved and continued punching of succeeding cards is accomplished by the mere physical act of inserting and removing the cards sequentially within card receiving slots 42 and 42′.

While the invention has been particularly shown and described with reference to a proferred embodiment thereof, it will be understood by those skilled in the art that various changes in form and details may be made therein without departing from the spirit and scope of the invention.

What is claimed is:

1. Apparatus for selectively punching cards and the like comprising: a card punch assembly, means normally holding said punch assembly at a reference position, punch field selection means, means responsive to placement of said card into punch receiving position for causing said punch assembly to move from said reference position to a position corresponding to punch field selection and for operating said punch assembly to punch said card.

2. An automatic card punch comprising: a punch assembly, means for supporting said punch assembly for relative movement with respect to said card to allow selective punching thereof, means normally holding said punch assembly at a reference position, punch field selection means, and means automatically responsive to placement of said card in card punching position for moving said punch assembly from the reference position to a position corresponding to punch field selection and for punching said card.

3. An automatic card punch comprising: a punch assembly, means for supporting said punch assembly for relative movement with respect to said card to allow selective punching thereof, means normally holding said punch assembly at a reference position, punch field selection means including a manually movable indexing head, means carried by said head and responsive to head index position for determining the position of said punch at the time of punching, and means automatically responsive to placement of said card in card punching position for moving said punch assembly from said reference position to said predetermined punching position and for subsequently punching said card.

4. An automatic card punch comprising: a punch assembly, means for supporting said punch assembly for relative movement with respect to said card to allow selective punching thereof, means normally holding said punch assembly at a reference position, a cylindrical index head mounted for rotation about its axis adjacent said punch assembly, means forming recesses of axially varying length circumferentially spaced about said head periphery, a follower carried by said punch assembly and movable into a selected index head recess, and means automatically responsive to placement of said card in card punching position for moving said punch assembly from said reference position along said index head whereby said follower contacts the end of said recess to terminate movement of said punch card assembly at a punch field position correlated to head index position and for punching said card.

5. The punch as claimed in claim 4 further including means responsive to automatic punching of said card for indexing said index head one index position position.

6. The punch as claimed in claim 4 further including means responsive to punching of said card for automatically ejecting said card from punch receiving position.

7. The punch as claimed in claim 4 further including means adjacent said card for visually correlating punch field index head selection and resultant card punching.

8. An automatic card punch comprising: a punch assembly, means for supporting said punch assembly for relative movement with respect to said card to allow selective punching thereof, means normally holding said punch assembly at a reference position, an oscillating punch actuator for effecting cyclic operation of said punch, a rotatable index head mounted for rotation adjacent said punch assembly, means forming a series of circumferentially spaced recesses of axially varying length about the periphery of said index head, a cocking disc positioned for limited oscillation about the axis of said indexing head, an oscillating cocking lever carried by said punch actuator and operative to cyclically oscillate said cocking disc, ratchet means carried by said index head, pawl means carried by said cocking disc and responsive to oscillation of said cocking disc for automatically indexing said index head one index position per cycle, follower means carried by said punch assembly and movable into a selected index head recess, and means automatically responsive to placement of said card in card punching position for moving said punch assembly from said reference position along said index head whereby said follower means contacts the end of said recess to terminate movement of said punch assembly at a card punch field position correlated to head index position and for punching said card.

9. The punch claimed in claim 8 further including a back-up pawl, and means for biasing said back-up pawl into engagement with said ratchet for preventing rotation of said indexing head as said cocking pawl moves into engagement with the next tooth carried by said ratchet means.

10. The punch as claimed in claim 9 further including a holding notch formed within said cocking disc spaced from said pawl means, a holding pawl, means tending to bias said holding pawl into engagement with said cocking disc notch, and means for preventing said engagement when said punch actuator is moved into punch engaging position, whereby said cocking disc effects indexing of said ratchet means at the termination of the punch actuator return stroke.

11. An automatic card punch for punching a file card or the like at selective positions within multiple punch field areas comprising: at least two punch assemblies, means for supporting said punch assemblies for relative movement with respect to said card to allow selective punching thereof, means normally holding said punch assemblies at respective reference positions, punch field selection means for each punch assembly, and means automatically responsive to placement of said card in card punching position for moving said punch assemblies from their reference positions to positions corresponding to punch field selection and for subsequently punching said card.

12. The automatic card punch claimed in claim 11 further including means responsive to cyclic operation of said punch assembly for automatically indexing said punch field selection means to the next highest punch field position.

13. An automatic card punch comprising: means for supporting a card in punch receiving position, a punch assembly, means for supporting said punch assembly for longitudinal movement with respect to said card to allow selective punching thereof, means normally holding said punch assembly at a longitudinal reference position, means tending to bias said punch assembly toward a predetermined punch card field position, indexing means for selecting one of said punch field positions, a cyclically driven punch actuator, and means responsive to operation of said punch actuator to release said holding means whereby said biasing means tends to move said punch assembly longitudinally of said card, and means responsive to said indexing means for limiting longitudinal movement of said punch assembly whereby said punch assembly moves to a card punch field position correlated to the position of said index means to allow said card to be punched by said cyclically driven punch actuator.

14. An automatic card punch comprising: means for momentarily supporting a card in punch receiving position, a punch assembly, means for supporting said punch assembly for relative movement with respect to said card to allow punching at selective punch field positions, an oscillating punch actuator operatively positioned with respect to said punch assembly for cyclically punching said card at a selected punch field position, a member carried by said punch actuator for normally following said punch actuator as it oscillates, biasing means tending to bias said punch assembly away from said reference position, means mechanically linking said follower member to said punch assembly whereby said follower tends to hold said punch assembly at said reference position when said punch actuator is disengaged from said punch, punch field selection means and means automatically responsive to placement of said card in card punching position for causing said punch actuator to operate said punch whereby said follower allows said biasing means to move said punch assembly from said reference position to a position corresponding to punch field selection to punch said card at said selected card punch field position.

15. The automatic card punch claimed in claim 14 further including means for automatically ejecting said card from punch receiving position during the return stroke of said punch actuator.

16. An automatic card punch comprising: a punch assembly, means for supporting said punch assembly for relative movement with respect to said card to allow selective punching thereof, punch field selection means including a manually movable indexing head, means carried by said head and responsive to head index position for determining the position of said punch at the time of punching, and means for moving said punch assembly from said reference position to said predetermined punching position and for subsequently punching said card.

17. The punch as claimed in claim 16 further including means responsive to punching of said card for indexing said index head one index position.

18. The punch as claimed in claim 16 further including means responsive to punching of said card for automatically ejecting said card from punch receiving position.

19. The punch as claimed in claim 16 further including means adjacent said card for visually correlating punch field index head selection and resultant card punching.

20. An automatic card punch comprising: a punch assembly, means for supporting said punch assembly for relative movement with respect to said card to allow selective punching thereof, a cylindrical index head mounted for rotation about its axis adjacent said punch assembly, means forming recesses of axially varying length circumferentially spaced about said head periphery, a follower carried by said punch assembly and movable into a selected index head recess, and means for moving said punch assembly from said reference position along said index head whereby said follower contacts the end of said recess to terminate movement of said punch card assembly at a punch field position correlated to head index position and for punching said card.

References Cited

UNITED STATES PATENTS 2,248,136   7/1941   Swanson ____________ 234—51

FOREIGN PATENTS 844,224   7/1952   Germany.

WILLIAM W. DYER, Jr., *Primary Examiner.*

GERALD A. DOST, *Examiner.*